United States Patent [19]
Ohta et al.

[11] Patent Number: 5,284,236
[45] Date of Patent: Feb. 8, 1994

[54] STACKED RUBBER TIRE SEPARATION-TRANSPORT APPARATUS

[75] Inventors: Yasuhiro Ohta, Sakurai; Masaru Umemoto, Kashiwara; Kenryo Kashiwagi, Yao, all of Japan

[73] Assignee: Tsubakimoto Chain Co., Osaka, Japan

[21] Appl. No.: 40,406

[22] Filed: Mar. 31, 1993

[30] Foreign Application Priority Data

Jan. 11, 1993 [JP] Japan .................................. 5-17860

[51] Int. Cl.⁵ .............................................. B65G 47/12
[52] U.S. Cl. ...................................... 198/454; 198/624
[58] Field of Search ............... 198/453, 454, 533, 623, 198/624, 415

[56] References Cited

U.S. PATENT DOCUMENTS

| | | | |
|---|---|---|---|
| 3,047,123 | 7/1962 | McKay | 198/415 |
| 3,602,358 | 8/1971 | Jakobsson | 198/415 X |
| 3,610,391 | 10/1971 | Beck | 198/624 X |
| 4,545,714 | 10/1985 | Johnson et al. | 198/623 X |

Primary Examiner—Cheryl L. Gastineau
Attorney, Agent, or Firm—Eugene E. Renz, Jr.

[57] ABSTRACT

A stacked rubber tire separation-transport apparatus equipped with a low-speed discharge conveyor at the bottom of a rubber tire stack hopper with a discharge end section formed on a downward inclined discharge surface and with high-speed separation rollers in the vicinity of both sides of the discharge end section for contact with at least some of the tires.

1 Claim, 4 Drawing Sheets

STACKED RUBBER TIRE SEPARATION-TRANSPORT APPARATUS

FIELD OF THE INVENTION

The present invention relates to improvements in apparatus for feeding used rubber tires in small quantities to a separation conveyor which discharges the rubber tires as an auxiliary fuel one by one into an incinerator.

BACKGROUND OF THE INVENTION

Used and worn out rubber tires from vehicles such as automobiles and the like are presently being used as an auxiliary fuel. These waste tires are charged individually into an incinerator in order to control the incinerator temperature. Delivery of a large stack of waste tires has previously required that the tires be separated manually. However, since the contact surface of waste tires is made of rubber which has a high co-efficient of friction, it is extremely difficult to slide the tires, particularly when two or more tires are in mutual contact. The work required for manual separation of the waste tires is difficult and cannot be easily performed.

In some instance, such as when waste tires are used for fuel in a calcination kiln for cement, there is a need to charge the waste tires into the incinerator continuously over a complete twenty-four hour period. As a result, supplies cannot be stockpiled and this process becomes labor intensive.

In order to resolve this problem, two prior Japanese Patent Publications have proposed systems for operation of a waste tire separating system. In Japanese Patent Publication No. 11808/1982, tires are individually separated using a stream of water. In order to deal with a large quantity of waste tires, a large pool of water is required. Moreover, the work involved in draining water to remove the water from the annular hollow space in the tires which have been separated is necessary before the individual tires can be transported to an incinerator.

In another disclosure, Japanese Patent Publication No. 11955/1988 describes a transport technique for classifying individually separated waste tires by size. This patent publication does not contain any disclosure of the method for individual separation of large quantities of stacked tires.

Accordingly, it is objection of the present invention to provide a system for facilitating the individual separation of waste tires.

More particularly, it is the object of the present invention to separate large numbers of stacked waste tires into smaller quantities or groups, to then transport them to an individually separating conveyor system.

Other objects will appear hereinafter.

SUMMARY OF THE INVENTION

It is now been discovered that the above and other objects of the present invention may be accomplished in the following manner. Specifically, a waste tire separation transport apparatus has been discovered which employs a low speed transport conveyor disposed at the bottom of a rubber tire stack hopper. The discharge end section of the conveyor is formed on downward inclined discharge surface. Separation rollers rotating at a high speed are installed vertically or upright on at least one side of the discharge end section. As the rollers rotate, they frictionally engage certain of the waste tires impelling them by their rotation toward the discharge end, thereby separating the tires. The tires then are placed on a separation conveyor which takes them to the incinerator or other place of intended use.

In operation, this large quantity or multitude of waste tires are stacked in the hopper and are loaded on to the discharge conveyor through the bottom of the hopper. The conveyor moves at a slow speed, gradually approaching the discharge end section. The waste tires contact the separation roller which are rotating at a relatively high speed with respect to the speed of the conveyor and these tires will then be driven out faster than the rest of the waste tires. Slowly, the stacked tires will decrease in size. Those tires which are not contacted by the separation rollers and tires which are in a unstable orientation will eventually successfully fall to be separated by small distances as they travel down the downward inclined discharge surface. Accordingly, a large multitude of stacked waste tires are discharged on to the separation conveyor for facilitating the individual separation and further processing as desired.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
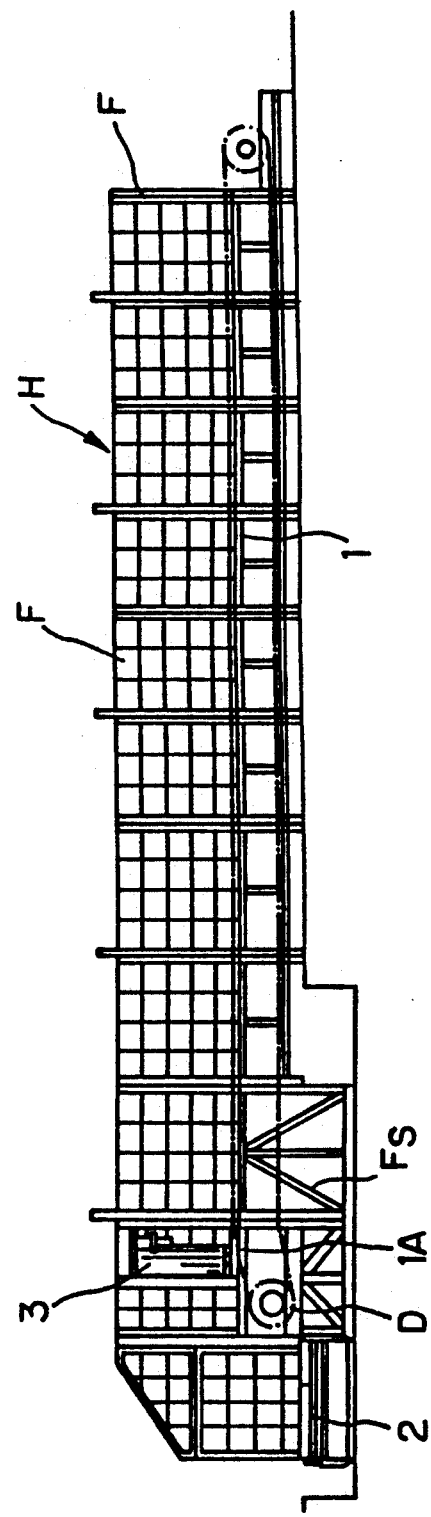
FIG. 1 is a front view showing an embodiment of the stacked rubber tire separation-transport apparatus according to the present invention.
Figure 2:
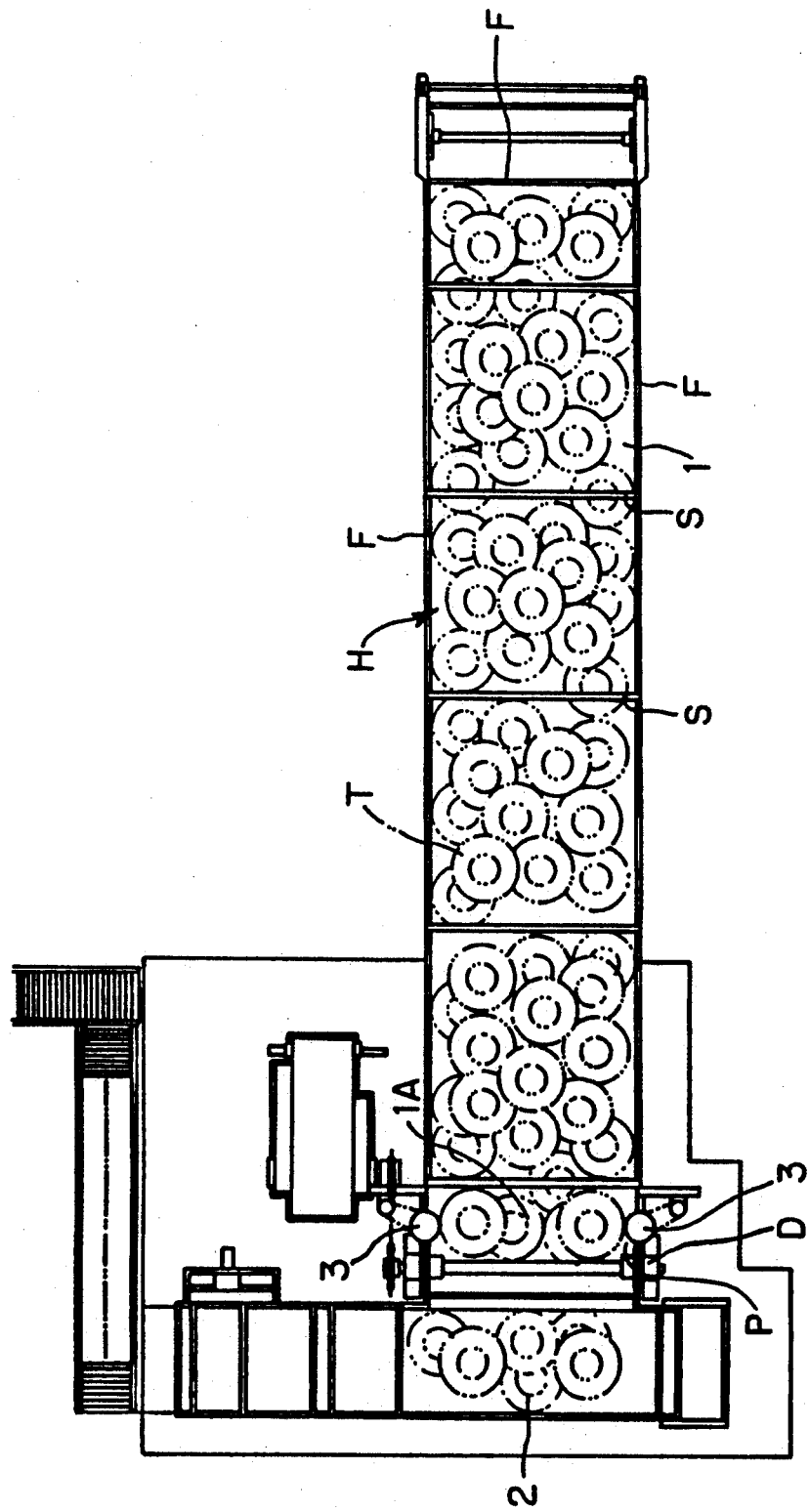
FIG. 2 is a plan view of FIG. 1.
Figure 3:
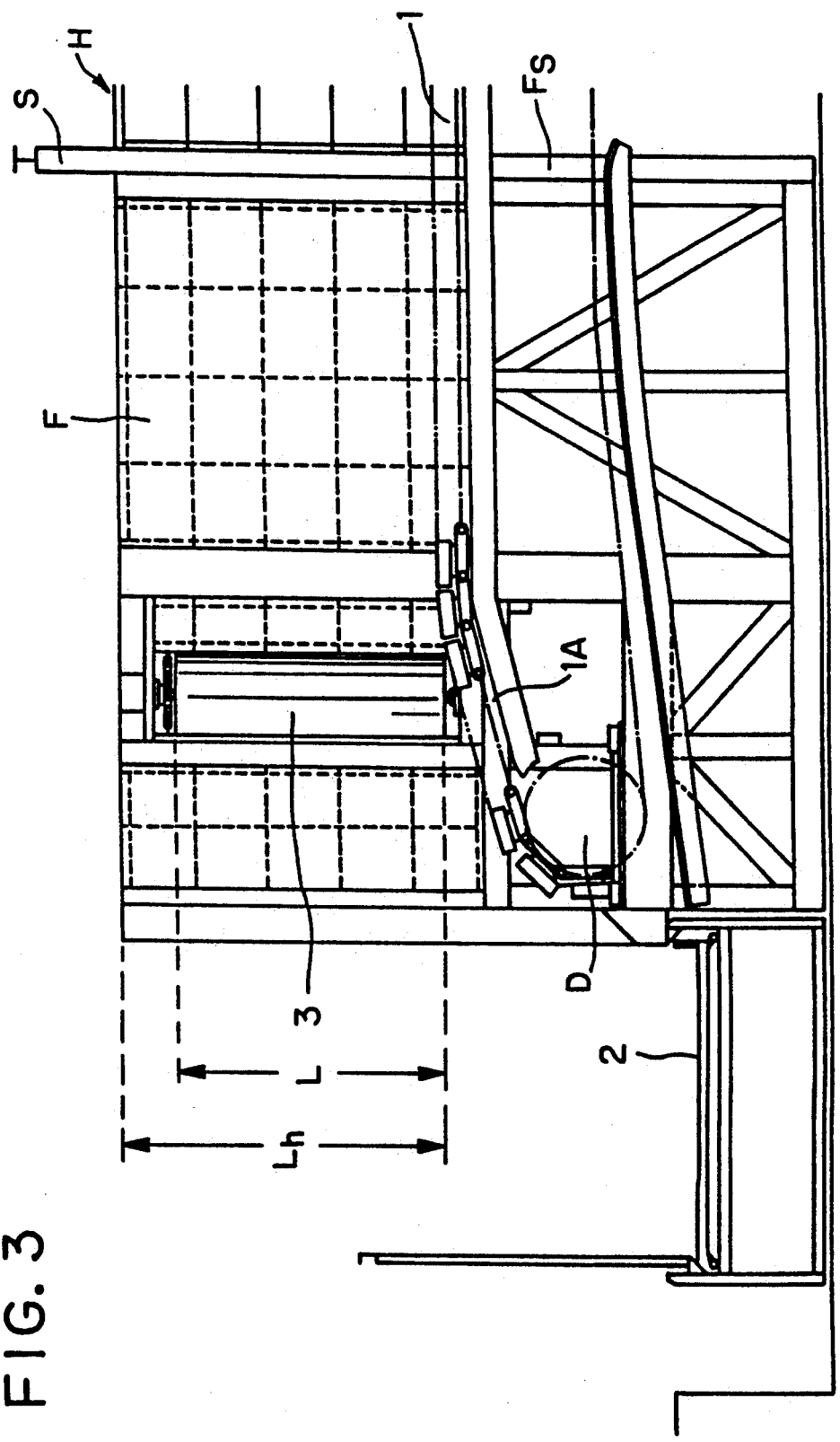
FIG. 3 is an enlarged front view showing a major portion of the discharge conveyor of FIG. 1.

FIG. 1 is a front view of a rubber tire separation transport apparatus for separating and conveying waste tires which have been stacked on a rack. FIG. 2 is plan view of the same device while FIG. 3 is an enlarged front view of a major portion of the discharge end of the apparatus. Waste tires T are stacked within a hopper H which has fixed walls F on three sides and which is open only on the discharge or the fourth side of the hopper. Support bars S support the top of fixed walls F and provide stability to the hopper. The bottom of the hopper is open to a discharge conveyor 1, as both fixed walls F and discharge conveyor 1 are supported on a frame system $F_s$. The discharge conveyor 1 is controlled to be driven by driving pulley D at a slow speed so that the waste tires will be supplied at an appropriate rate for use. These tires are delivered to a separation conveyor 2 which can accommodate a specific given number of tires for a predetermined period of time.

The discharge end section of discharge conveyor 1 is formed by a downwardly inclined discharge surface 1A shown in FIG. 3. Also part of this discharge mechanism is a pair of separation rollers 3 which are placed proximate the sides of the hopper, shown in FIG. 3 inside the fixed side walls F, for contact with the tires T which are closest to the fixed side walls F. As can be seen, the rollers 3 have their axes in a vertical plane and are adapted to be driven in both directions at speeds several times as fast as the speed of the conveyor 1. When roller 3 rotating at two or three times the speed of the conveyor contacts a tire, the tire is impelled toward the discharge end 1A at a greater speed, thereby both breaking up the congested pile of tires and separating them for individual delivery to the separation conveyor 2. The peripheral surfaces of the rollers 3 protrude into the waste tire discharge path P for contact with tires. The peripheral surfaces or rollers 3 may be provided with projections or protuberances extending 3A radially outward from roller 3 if it is needed to further increase the effect of the high speed rotation in moving the tires further on the path. The length L of the separation roller 3 is typically almost equal to the height $L_h$ of the hopper so as to cause the waste tires hanging in the hopper to roll on down toward the discharge end 1A.

The stacked tires, which have a high co-efficient of friction, are not easily slid over each other as surfaces of adjoining tires contact each other. Accordingly, the tires are carried in a pile, lump or entangled mass of tires on the discharge conveyor 1. As these tires reach the discharge end section of conveyor 1, part of the pile or heap of tires comes into contact with the peripheral surface of the rollers 3, which are rotating at a high speed. Since the rollers 3 are rotating at a speed which is higher than speed of the discharge conveyor 1, those tires are directed forward and separated from the other tires to break them up.

At the same time, waste tires are being carried in the center of the low speed conveyor 1 and those centrally located tires are not in position to contact separation rollers 3. As these centrally located tires arrive at the downwardly inclined discharge surface 1A at the discharge end of discharge conveyor 1, they too will be discharged downward successively onto the separation conveyor 2. Of course, those tires in an unstable condition will be the first to fall down to the separation conveyor 2 and may need to be restrained by barrier wall 2A. As the tires are separated into small numbers and discharged to the separation conveyor 2, it is clear that none of the tires will be discharged downward in a conglomeration of tires all attached by friction to one another. As is noted, driving pulley D causes movement of the discharge conveyor 1. Drive pulley D is driven by a motor as is the separation conveyor 2 and the high speed rollers 3. Typically, separation conveyor 2 operates at a faster speed than discharge conveyor 1 to maintain the separation achieved by this invention. These components are driven by conventional drive motors.

Figure 4:
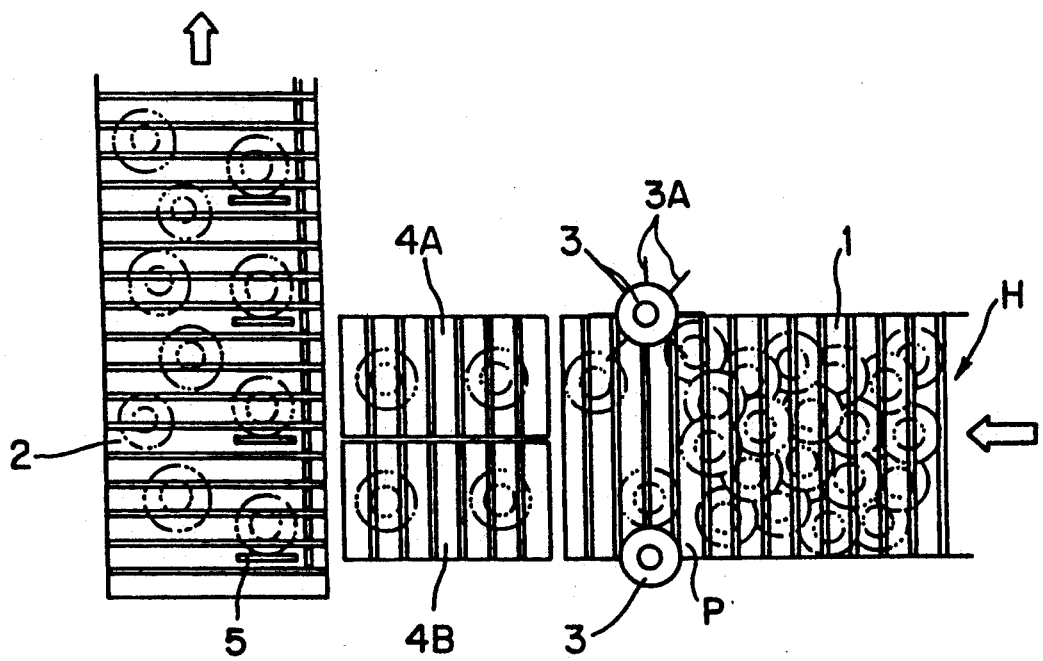
FIG. 4 is a schematic plan view showing another embodiment of the stacked rubber tire separation-transport apparatus according to the present invention.

Turning now to FIG. 4, an alternative embodiment is shown in which a plurality of adjusting conveyors 4A and 4B are provided. These adjusting conveyors 4A and 4B each have a belt surface which continues on from the discharge conveyor to end of separation conveyor 2. The adjusting conveyors 4A and 4B are variably adjustable to control the discharge quantity of the waste tires and limit the number of tires to a quantity which is suitable or discharge on the individually separating conveyor 2.

The conveyors 4A and 4B may also be inclined upwardly and waste tire support plates 5 may be installed vertically up from those conveyors to provide each of the adjusting conveyors 4A and 4B with a tire separating device. The discharge ends of conveyors 4A and 4B will be elevated in this embodiment. In this manner, the waste tires will be gradually discharged onto the discharge conveyor 2 which will also be elevated to prevent discharged tires from bouncing and otherwise re-entangled with other tires.

In yet another embodiment, the discharge conveyor 1 can also include two rows such as is shown with adjusting conveyors 4A and 4B. These two rows can be alternated or driven at different speeds. This will further adjust the quantity of waste tires to be discharged, as one or other of he discharge conveyors can be then operated. That alternating movement will also increase the tendency of the device to break the pile of tires into separated tires for conveyance away on the separation conveyor 2.

In operation, the present invention functions to provide an individual stream of waste tires by separating those which are initially placed in the stack hopper in a agglomerated state or condition. These tires, loaded into stack hopper, contact the discharge conveyor and are carried at a low speed as far as the separating rollers 3. The separating rollers 3 are rotating at a high speed with respect to the discharge conveyor 1, such as two or three times as fast or more. As individual tires T contact the separating rollers 3, they are separated from the other waste tires and forced or driven out along the discharge path 1A. This causes further dispersion of the tires as those tires that are not contacted fall to the side and forward. At the same time, sequential downward discharge of the mass of tires that have reached the discharged end 1A without contacting the separating rollers 3 will be carried out, starting with those waste tires which are in a unstable orientation. Consequently, on the separation conveyor 2, most waste tires will not reach the individual separation conveyor together but rather will be discharged individually and gradually. This will facilitate the individual separation of the waste tires by separation conveyor 2.

While various embodiments of the present invention have been shown, it will understood by those skilled in the art that various modifications and variations it may be effected in these exemplary embodiments without departing from scope and spirit of the present invention.

What is claimed is:

1. A stacked rubber tire separation-transport apparatus for separating stacked rubber tires equipped with a low-speed discharge conveyor at the bottom of a rubber tire stack hopper with a discharge end section formed on a downward inclined discharge surface and with high-speed separation rollers in the vicinity of both sides of said discharge end section for contact with at least some of said tires.

* * * * *